Patented Mar. 3, 1925.

1,528,396

UNITED STATES PATENT OFFICE.

RAY S. GEHR, OF CLEVELAND HEIGHTS, OHIO.

ANTIMONY-SULPHURET MIXTURE AND PROCESS OF MAKING SAME.

No Drawing.   Application filed November 19, 1923.   Serial No. 675,643.

*To all whom it may concern:*

Be it known that I, RAY S. GEHR, a citizen of the United States, residing at Cleveland Heights, in the county of Cuyahoga and State of Ohio, have invented certain new and useful Improvements in Antimony-Sulphuret Mixtures and Processes of Making Same, of which the following is a specification.

The invention relates to rubber vulcanizing agents and a process of producing them, and it has to do especially with the class of vulcanizing agents which consist of mixtures of antimony pentasulphide, free sulphur and a mechanical filler or loader. These latter vulcanizing agents are commonly known in the trade as antimony sulphurets or golden antimony.

One object of the present invention is the provision of a vulcanizing agent of the character in question having a filler with exceedingly small and relatively uniform particle size and that is free from change of its physical state under vulcanizing conditions.

Another object of the invention is the provision of a vulcanizing agent such as that last referred to which is susceptible of production at very moderate cost.

A further object of the invention is the production of a vulcanizing agent of the character in question characterized by great uniformity of composition.

In the manufacture of my improved product I preferably proceed as follows:

Taking sulphur flowers and stibnite ($Sb_2S_3$), I dissolve them in a strong solution of sodium sulphide in the proportions called for by the following reactions:

(1)   $3Na_2S + 2S + Sb_2S_3 = 2Na_3SbS_4$
(2)   $Na_2S + 2S = Na_2S_3$

These reactions are carried out by boiling the solution for about one hour. The solution is then diluted to such an extent that no crystallization will take place on cooling to room temperature and is then allowed to stand several hours to permit agglomeration and settling out of impurities consisting chiefly of ferrous sulphide. The clear liquid is then drawn off and run into an acid solution capable of reacting with the sodium thioantimonate and the sodium sulphide to form antimony pentasulphide, sulphur, hydrogen sulphide and soluble sodium salt. Any one of the three mineral acids, sulphuric, nitric and hydrochloric and also other acids such as acetic will serve this purpose. It is to be noted, however, that nitric acid, or any strongly oxidizing acid, must be used in suitably diluted form. Of all the usable acids, I prefer one of the mineral acids, and especially sulphuric acid on account of its low cost. Thus in the preferred procedure the clear solution of sodium thioantimonate and sodium polysulphide is run into an excess of dilute sulphuric acid at a preferable temperature of about 20° C., whereupon the following reactions take place:

(3)   $2Na_3SbS_4 + 3H_2SO_4 = 3Na_2SO_4 + Sb_2S_5 + 3H_2S$ (4)   $Na_2S_3 + H_2SO_4 = Na_2SO_4 + 2S + H_2S$

As a result of these last two reactions antimony pentasulphide and free sulphur are thrown down together as precipitates, the sodium sulphate is held in solution and the hydrogen sulphide is evolved as a gas. Preferably the hydrogen sulphide values are recovered by passing the gas through towers containing caustic soda to form sodium sulphide for use in the first part of the process.

The precipitate of antimony pentasulphide and sulphur is now washed free from soluble salts by decantation or on a filter, as is most convenient or economical under the circumstances. In either case the result is an intimate mixture of antimony pentasulphide and precipitated sulphur in sludge form.

During the above procedure, I separately prepare the mechanical filler in the form of finely divided silica. In the United States, and possibly also in some foreign countries, there occur certain deposits of silica in a cryptocrystalline state. This chalcedonic silica in the case of the natural deposits referred to is finely divided and is exceedingly pure except for grains of quartz in varying amounts dispersed through the mass of the softer, cryptocrystalline material. In the deposits known to me substantial masses occur with as low as 5% of the crystalline material, though the average runs higher than that. In the case of these particular deposits, the aggregate, unlike other forms of chalcedony, is quite easily broken down into its discrete particles. Sometimes materials of this character are called "tripoli", but the cryptocrystalline silica here in question is, of course, to be distinguished from diatomaceous earth which also is sometimes called tripoli. Typical deposits of the cryptocrystalline silica here referred to occur in southern Illinois.

I have found this cryptocrystalline silica, such as occurs in the last-named deposits, to be peculiarly suitable for the production of an inert filler for antimony sulphurets. As above indicated, the material is soft and is readily broken down to its discrete particles. The natural particle size of the cryptocrystalline material is, for a natural deposit, very small but it is not small enough to serve satisfactorily as a filler for antimony sulphurets, it being now well established that an exceedingly small particle size is desirable for this purpose. Accordingly, I take the material of the natural deposit and subject it to a thorough and prolonged grinding to effect a separation of the crystalline material from the cryptocrystalline material and a suitable subdivision of the latter. Because of the comparative softness of the cryptocrystalline material I find that it is possible to reduce it to an average particle size of about two (2) microns diameter at a very moderate cost.

The grinding and separating can be effected in any suitable manner that will preclude access of objectionable foreign material, particularly any foreign materials consisting of or containing iron or any material of an alkaline character.

One method of treatment which has been found satisfactory is grinding the material in water, care being taken that the water does not have access to any iron parts of the apparatus with resultant introduction of rust into the product. In the case of this water grinding treatment, the separation of the crystalline quartz from the cryptocrystalline silica can be effected very conveniently by flotation and settling in the course of the grinding treatment, the coarser and heavier quartz being readily settled out while the finer, cryptocrystalline silica is floated off.

When the grinding in water has been continued until the major part of the cryptocrystalline material has been reduced to the desired particle size, it is floated in water, allowed to settle out and then dried, in accordance with the usual practice in such grinding operations.

The exceedingly fine cryptocrystalline silica thus produced, I prepare in sludge form and then effect a very intimate mixture in desired proportions of this sludge and the antimony pentasulphide and sulphur sludge prepared as above described, the mixing of the two sludges being carried out by any suitable mechanical mixing apparatus. The sludge mixture is then filtered and dried. The dried product is then pulverized, preferably by passing it through a pulverizer of the air separation type, and is then ready for use.

Where the filler is prepared from the natural material on the premises where the sulphuret is produced, if the silica is ground in water, as above described, it will be understood, of course, that the material need not be dried before preparing it in the form of a sludge but that it can be taken from the grinding operation in sludge form ready for mixture with the pentasulphide and sulphur sludge. It is also to be understood that I use the term "sludge" in a broad sense indicating any water mixtures of the material in question and do not intend to indicate by it any particular consistency. The sludge can be made with any amount of water that will effect an intimate mixture of the materials to be brought together. The more water one uses, the more readily such mixture is effected. Furthermore, if one of the materials to be mixed, the pentasulphide-sulphur material, for example, is distributed through a rather large volume of water, the mixture in sludge form can be effected by gradually adding to said volume the other material in dry form, with vigorous agitation of the liquid meanwhile. As a general rule, however, I prefer to have each of the two materials in sludge form before bringing them together. In whatever way the sludge mixture is formed care should be had to insure the intimate mixture of the materials when dried.

My improved antimony sulphuret, prepared as above described, is distinguished from sulphurets heretofore commercially produced in that it conforms very closely to any desired and predetermined composition. This is due to the fact that the reactions employed in the production of the pentasulphide and precipitated sulphur are definite, quantitative and subject to absolute control. Furthermore, the composition of the product can be varied through a practically unlimited range of predetermined proportions of the three constituents. Besides, the silica filler is absolutely inert chemically under all rubber vulcanizing conditions and, being free of water of crystallization, does not tend to change its physical state by vaporizing under the action of the heat of vulcanization. Finally, the filler of cryptocrystalline silica prepared as above described has an exceedingly small and relatively uniform particle size. As above indicated, it has been found commercially feasible to reduce the particle size to an average of about two (2) microns.

As I have already indicated, the cryptocrystalline silica can be ground in various ways, and to further explain my invention I will describe one other method which utilizes the principle of air separation. In pulverizers of the air separation type large volumes of air are blown through the pulverizing chamber and only particles which have been reduced to a given size are carried by the air currents from said chamber. Said air currents pass to a settling space or chamber from the bottom of which the pulverized material is drawn, while the air passes on into a chamber or chambers the walls of which are formed by fine mesh cloth through which the air escapes to the atmosphere. The major part of the pulverized material separates from the air in the settling chambers, but exceedingly fine particles do not settle there but remain in suspension and pass into the cloth-walled chambers and are there separated from the air which passes through said walls. This last mentioned material is exceedingly fine and, in the case of the cryptocrystalline silica in question, it approximates the particle size of the material produced by grinding in water as previously described. When the air separation process grinding is employed, the coarser material which separates out in the settling chambers is useful as an inert filler in other arts.

When the air separation grinding is to be employed, I prefer to hand pick the silica rock to eliminate that containing the higher percentages of crystalline quartz; for while very little of the crystalline material tends to pass over with the exceedingly fine crytocrystalline material into the cloth-walled chambers of the separator, a substantial percentage may enter the settling chambers and mingle with the coarser material there, and for some uses it is desirable to keep this coarser material comparatively free from the quartz.

To make the procedure in carrying out my invention quite clearly understood, I will here indicate the amounts of the various materials suitable for the production of a sulphuret of a particular composition. Let it be assumed that the percentage composition by weight of a desired antimony sulphuret is $Sb_2S_5$—37%
S—13%±0.5%
Silica—50%

Then to produce 100 lbs. of the sulphuret, materials are used in the following amounts:

| | Lbs. | Ozs. |
|---|---|---|
| Fused sodium sulphide (57½% $Na_2S$) | 65 | 4 |
| Sulphur flowers | 19 | 0 |
| Stibnite (97½% $Sb_2S_3$) | 32 | 0 |

Water, 12 gallons.

(After dissolving the sodium sulphide, sulphur and stibnite by boiling, the solution is diluted to 50 gallons, to settle.)

| | Lbs. | Ozs. |
|---|---|---|
| $H_2SO_4$ (93%) | 56 | 0 |
| Cryptocrystalline silica | 50 | 0 |

It will be understood that the dilution of the sodium sulphide, sulphur and stibnite solution to 50 gallons is for the purpose of avoiding crystallization when the solution is cooled to room temperature. It will also be clear that the composition of the sulphuret, as to the proportions of the three constitutents can be varied at will through a practically unlimited range by use of suitable amounts of the raw materials.

From the foregoing description the advantages attaching to my improved antimony sulphuret and the process of producing it will be appreciated by those familiar with materials of this kind and especially with the sulphurets which have heretofore been produced by what is known as the lime process. In this latter process lime, sulphur and stibnite are boiled together and then the final product is precipitated from the resulting solution by pouring it into dilute sulphuric acid. The reactions involved are complex and not well understood. They are not quantitative nor subject to close control. There is, furthermore, a substantial loss of antimony. And finally, the calcium sulphate precipitated with the antimony pentasulphide and sulphur serves as the mechanical filler of the final product and is in the form of crystals ranging in size up to 150 microns, and contains water of crystallization. In the rubber vulcanizing processes, this latter water of crystallization is often converted into vapor with resulting porosity and spotting of the rubber.

With the sulphuret made by my process, on the other hand, a composition can be so closely predetermined that it is not necessary for the user of the product to "doctor" or adjust the composition to compensate for variations, and a rubber stock is secured by use of my sulphuret having the superior qualities due to the physical inertness (resulting from absence of water of crystallization) and the exceedingly fine particle size of the silica filler. Furthermore, I have found that the extreme purity of the cryptocrystalline silica as it is found in certain natural deposits, its extreme chemical inertness and its freedom from alkaline reaction render it especially suitable as a filler for use in connection with antimony pentasulphide inasmuch as it does not chemically modify the characteristic and desirable color effect of the pentasulphide.

While I prefer my improved sulphuret and the process of making it as above described, it will be understood that there can be variations in various respects from the foregoing description without departing from the invention as defined in the appended claims.

What I claim is:

1. A vulcanizing agent comprising in combination an intimate mixture of antimony pentasulphide, precipitated free sulphur, and powdered silica.

2. A vulcanizing agent comprising in combination an intimate mixture of antimony pentasulphide, precipitated free sulphur, and powdered cryptocrystalline silica.

3. A vulcanizing agent comprising in combination an intimate mixture of antimony pentasulphide, precipitated free sulphur, and silica having a particle size of less than 10 microns diameter.

4. A vulcanizing agent comprising in combination an intimate mixture of antimony pentasulphide, precipitated free sulphur, and cryptocrystalline silica having a particle size of less than 10 microns diameter.

5. A vulcanizing agent comprising in combination an intimate mixture of antimony pentasulphide, precipitated free sulphur, and cryptocrystalline silica having a particle size of less than 5 microns diameter.

6. The improved process of making vulcanizing agents of the character set forth comprising dissolving sulphur and stibnite in sodium sulphide solution to form a solution of sodium thioantimonate ($Na_3SbS_4$) and sodium sulphide ($Na_2S_3$), mixing the latter solution with an acid to form a precipitate of antimony pentasulphide and sulphur, preparing said precipitate in the form of a sludge, preparing cryptocrystalline silica with a particle size of less than 10 microns diameter in the form of a sludge, effecting an intimate mixture of the two sludges, drying the resultant mixture, and pulverizing said mixture.

7. The improved process of making vulcanizing agents of the character set forth comprising dissolving sulphur and stibnite in sodium sulphide solution to form a solution of sodium thioantimonate ($Na_3SbS_4$) and sodium sulphide ($Na_2S_3$), mixing the latter solution with an acid to form a precipitate of antimony pentasulphide and sulphur, preparing said precipitate in the form of a sludge, grinding cryptocrystalline silica to an average particle size of less than 5 microns diameter, preparing said ground silica in the form of a sludge, effecting an intimate mixture of the two sludges, drying the resultant mixture, and pulverizing said mixture.

8. The improved process of making vulcanizing agents of the character set forth comprising dissolving sulphur and stibnite in sodium sulphide solution to form a solution of sodium thioantimonate ($Na_3SbS_4$) and sodium sulphide ($Na_2S_3$), mixing the latter solution with an acid to form a precipitate of antimony pentasulphide and sulphur, preparing cryptocrystalline silica with a particle size of less than 10 microns diameter, effecting an intimate mixture in sludge form of said precipitate and silicate, drying the resultant mixture, and pulverizing said mixture.

9. The improved process of making vulcanizing agents of the character set forth comprising dissolving sulphur and stibnite in sodium sulphide solution to form a solution of sodium thioantimonate ($Na_3SbS_4$) and sodium sulphide ($Na_2S_3$), mixing the latter solution with an acid to form a precipitate of antimony pentasulphide and sulphur, grinding cryptocrystalline silica to an average particle size of less than 5 microns diameter, effecting an intimate mixture in sludge form of said precipitate and ground silica, drying the resultant mixture, and pulverizing said mixture.

In testimony whereof, I hereunto affix my signature.

RAY S. GEHR.